United States Patent
Forty et al.

(10) Patent No.: US 11,724,589 B2
(45) Date of Patent: Aug. 15, 2023

(54) MOTOR VEHICLE BONNET SEAL ARRANGEMENT

(71) Applicant: Jaguar Land Rover Limited, Coventry (GB)

(72) Inventors: Roger Forty, Coventry (GB); Michael Powell, Coventry (GB); Philip Dryhurst, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 754 days.

(21) Appl. No.: 16/473,513

(22) PCT Filed: Dec. 13, 2017

(86) PCT No.: PCT/EP2017/082503
§ 371 (c)(1),
(2) Date: Jun. 25, 2019

(87) PCT Pub. No.: WO2018/127369
PCT Pub. Date: Jul. 12, 2018

(65) Prior Publication Data
US 2020/0148056 A1    May 14, 2020

(30) Foreign Application Priority Data
Jan. 5, 2017 (GB) .................................. 1700106

(51) Int. Cl.
*B60K 13/06* (2006.01)
*B60K 13/02* (2006.01)
(Continued)

(52) U.S. Cl.
CPC .............. *B60K 13/06* (2013.01); *B60K 13/02* (2013.01); *B62D 25/105* (2013.01); *B62D 25/12* (2013.01); *F02M 35/0205* (2013.01)

(58) Field of Classification Search
CPC ...... B62D 25/12; B62D 25/10; B62D 25/105; B60R 13/06; B60R 13/0838; B60K 13/02; B60K 11/08
See application file for complete search history.

(56) References Cited

U.S. PATENT DOCUMENTS 2,216,111 A * 10/1940 Huet ...................... B60K 11/06
165/44
2,881,860 A * 4/1959 Ternes ................... F02M 35/14
55/385.3
(Continued)

FOREIGN PATENT DOCUMENTS

FR    2 921 591 A1    4/2009
GB    2304085 A    3/1997
(Continued)

OTHER PUBLICATIONS

Patents Act 1977: Combined Search and Examination Report under Sections 17 and 18(3), UKIPO Application No. GB1700106.6, dated Jul. 6, 2017, 8 pp.
(Continued)

*Primary Examiner* — Emma K Frick
(74) *Attorney, Agent, or Firm* — Carlson, Gaskey & Olds, P.C.

(57) ABSTRACT

A motor vehicle having a vehicle body, an engine compartment (10) housing an engine (12) and a bonnet seal arrangement (30, 34). The bonnet seal arrangement defines an opening (35) and is configured to deflect ram air received at the front of the motor vehicle (2) in use past the opening (35) to define a first air flow path, and draw air from the first air flow path through the opening (35) to define a second air flow path for supplying air to the intake duct orifice (42), the second air flow path being angled in a horizontal plane to the first air flow path.

18 Claims, 5 Drawing Sheets

(51) Int. Cl.
*B62D 25/10* (2006.01)
*B62D 25/12* (2006.01)
*F02M 35/02* (2006.01)

(56) References Cited

U.S. PATENT DOCUMENTS

| | | | | |
|---|---|---|---|---|
| 3,481,117 | A * | 12/1969 | McKinlay | F02M 35/10255 137/485 |
| 4,114,714 | A * | 9/1978 | Fachbach | B60R 13/0861 181/204 |
| 4,533,012 | A * | 8/1985 | Komoda | B60K 13/02 180/69.21 |
| 5,277,656 | A * | 1/1994 | Koukal | B60H 1/28 454/147 |
| 5,794,733 | A * | 8/1998 | Stosel | F02M 35/10137 180/68.1 |
| 6,056,075 | A * | 5/2000 | Kargilis | B62D 25/105 180/69.2 |
| 7,234,555 | B2 * | 6/2007 | Khouw | F02M 35/10262 180/69.2 |
| 7,237,635 | B2 * | 7/2007 | Khouw | F02M 35/10262 180/68.3 |
| 7,523,798 | B2 * | 4/2009 | Muramatsu | B60K 11/08 180/68.1 |
| 8,201,651 | B2 * | 6/2012 | Salvesen | F02M 35/10118 180/68.3 |
| 8,439,143 | B2 * | 5/2013 | Leanza | F02M 35/161 180/68.3 |
| 8,540,043 | B2 * | 9/2013 | Mehlos | B60K 13/02 180/68.1 |
| 9,731,592 | B2 * | 8/2017 | Kunimasa | B60K 13/02 |
| 9,744,921 | B2 * | 8/2017 | Yamaguchi | B62D 25/105 |
| 9,770,975 | B2 * | 9/2017 | Sokol | B60K 11/085 |
| 10,648,431 | B2 * | 5/2020 | Watanabe | F02M 35/02416 |
| 2005/0230162 | A1 | 10/2005 | Murayama et al. | |
| 2006/0006011 | A1 | 1/2006 | Khouw et al. | |
| 2006/0048986 | A1 * | 3/2006 | Bracciano | B60H 1/28 180/69.2 |
| 2012/0048632 | A1 | 3/2012 | Mehlos et al. | |
| 2021/0402870 | A1 * | 12/2021 | Moradnia | F01P 7/10 |

FOREIGN PATENT DOCUMENTS

| | | |
|---|---|---|
| JP | 2-109721 A | 4/1990 |
| JP | 3-11118 A | 1/1991 |
| JP | 2016-22831 A | 2/2016 |

OTHER PUBLICATIONS

International Search Report and Written Opinion of the International Searching Authority, International Application No. PCT/EP2017/082503, dated Apr. 17, 2018, 15 pp.

* cited by examiner

MOTOR VEHICLE BONNET SEAL ARRANGEMENT

RELATED APPLICATIONS

This application is a 35 U.S.C. § 371 national stage application of PCT Application No. PCT/EP2017/082503, filed on Dec. 13, 2017, which claims priority from Great Britain Patent Application No. 1700106.6, filed on Jan. 5, 2017, the contents of which are incorporated herein by reference in their entireties. The above-referenced PCT International Application was published in the English language as International Publication No. WO 2018/127369A1 on Jul. 12, 2018.

TECHNICAL FIELD

The present disclosure relates to a motor vehicle having a bonnet seal arrangement. Aspects of the invention relate to a motor vehicle, a bonnet seal arrangement and a vehicle engine air induction system.

BACKGROUND

Conventional motor vehicles generally include an internal combustion engine which relies upon an ample source of air for proper combustion of supplied fuel. In order to provide the necessary airflow, such vehicles therefore typically include an air induction system.

Generally, the role of the air induction system is to provide ambient air from outside the vehicle to the engine. When the vehicle is in motion, the ambient air is supplied to the vehicle as ram air. The ram air is forced through an exterior intake port at the front of the vehicle, and supplied to the vehicle engine via one or more air ducts. In order to filter out dirt and other foreign particles from the air and prevent them from entering the engine and possibly damaging the engine, the air duct(s) typically include an air cleaner comprising a filter.

In many circumstances, the air cleaner is sufficient to remove contaminants from the drawn-in air. However, in certain circumstances, the ram air entering through the exterior intake port may include contaminants such as water, snow, sand, dust or other similar particles which lower the function of the air cleaner. These contaminants can reduce the functionality and performance of the air cleaner and thereby inhibit airflow through the induction system, which affects the performance of the engine.

Specific pre-filters have been proposed by the prior art, however these are often bulky and are difficult to fit within tight vehicle packaging requirements.

It is the aim of the present invention reduce the flow of contaminants to the air duct(s) of the air induction system.

SUMMARY OF THE INVENTION

Aspects and embodiments of the invention provide a motor vehicle, a bonnet seal arrangement and a vehicle engine air induction system as claimed in the appended claims.

According to an aspect of the invention, there is provided a motor vehicle comprising: a vehicle body; an engine compartment housing an engine; a bonnet movably coupled to the body and arranged to provide a closure member for the engine compartment, the bonnet being movable between open and closed conditions; a bonnet seal arrangement defining an opening; an engine air intake duct having an orifice through which air is drawn into the engine in use; wherein the bonnet seal arrangement is configured to deflect ram air received at the front of the motor vehicle in use past the opening to define a first air flow path, and draw air from the first air flow path through the opening to define a second air flow path for supplying air to the intake duct orifice, the second air flow path being angled in a horizontal plane to the first air flow path.

According to embodiments of the invention, ram air received at the front of the vehicle body in use is directed past the opening defined by the bonnet seal arrangement and uncontaminated air is drawn from that flow. The bonnet seal arrangement thereby provides a means of drawing uncontaminated air from the ram air, which may be laden with contaminants such as water, snow, sand, dust or other similar particles. The seal arrangement protects the uncontaminated air flow path from the contaminant particles in the ram air. Due to the large inertial mass of contaminant particles compared to air particles, the contaminants are not drawn from that flow, but instead continue past the opening defined by the bonnet seal arrangement. Accordingly, uncontaminated air is drawn along the uncontaminated air flow path.

This aspect of the invention provides a motor vehicle having an ample supply of air to be provided to the engine for combustion of fuel whilst preventing contaminants that may be present in ram air from entering the engine air intake duct. Thus, the bonnet seal arrangement in accordance with embodiments of the invention reduces the undesirable effects of contaminants on engine air induction systems, in particular aiming to prevent contaminants inhibiting airflow through the induction system, blocking the engine intake manifold or damaging the engine. The use of the bonnet seal arrangement in accordance with embodiments of the invention allows a vehicle to travel increased distances in conditions which the ambient air contains high levels of contaminants. Furthermore, the use of engine sealing for the purpose of filtering out dirt and other foreign particles from the air and preventing them from entering the engine provides a space-saving solution to the problem.

The bonnet seal arrangement reduces deceleration of the ram air as the first air flow path is defined to ensure the inertia of the contaminant particles remains high, thereby ensuring that the contaminants continue past the opening defined by the bonnet seal arrangement.

The bonnet seal arrangement may comprise a first seal and a second seal located aft of the first seal.

The bonnet seal arrangement may be arranged on a lower surface of the bonnet.

The seal arrangement may be configured to direct the first air flow path to an exterior of the vehicle body. This further reduces deceleration of the ram air as the first air flow path is defined, to ensure the inertia of the contaminant particles remains high.

An upstream portion of the second air flow path may extend substantially orthogonally to a vehicle body longitudinal axis. Alternatively, or additionally, an upstream portion of the second air flow path may extend substantially orthogonally to the first air flow path.

The bonnet may comprise a cavity. Additionally, the cavity of the bonnet is defined by an external panel and an internal panel.

The vehicle bonnet internal panel may be sculpted to define an upstream portion of the second air flow path. This arrangement provides a deceleration of the uncontaminated air flow.

An upstream portion of the second air flow path may be fluidly connected to a primary air intake orifice formed in the internal panel.

A downstream portion of the second air flow path may be defined within the cavity of the bonnet.

The downstream portion of the second air flow path may terminate at the engine air intake duct orifice.

A third air flow path may be defined between a wade duct orifice in the bonnet and the engine air intake duct orifice. The wade duct orifice provides a means for providing intake air to the engine in the event that ram air is prevented from being received at the front of the vehicle in use, for example during a wading operation where a portion of the front of the vehicle becomes submerged in liquid.

A wade duct seal may extend from the bonnet seal arrangement around the wade duct orifice.

The first seal may comprise two seal members.

According to another aspect of the invention, there is provided a vehicle bonnet seal arrangement defining an opening, wherein the bonnet seal arrangement is configured to deflect ram air received at the front of a motor vehicle in use past the opening to define a first air flow path, and draw air from the first air flow path through the opening to define a second air flow path, the second air flow path being angled in a horizontal plane to the first air flow path.

The bonnet seal arrangement may comprise a first seal and a second seal located aft of the first seal.

The bonnet seal arrangement may be configured to direct the first air flow path to an exterior of a vehicle body of the motor vehicle.

An upstream portion of the second air flow path may extend substantially orthogonally to a vehicle body longitudinal axis.

An upstream portion of the second air flow path may extend substantially orthogonally to the first air flow path.

According to yet another aspect of the invention, there is provided a vehicle engine air induction system comprising the vehicle bonnet seal arrangement described above.

The vehicle engine air induction system may further comprise an engine air intake duct fluidly connected to the second air flow path.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
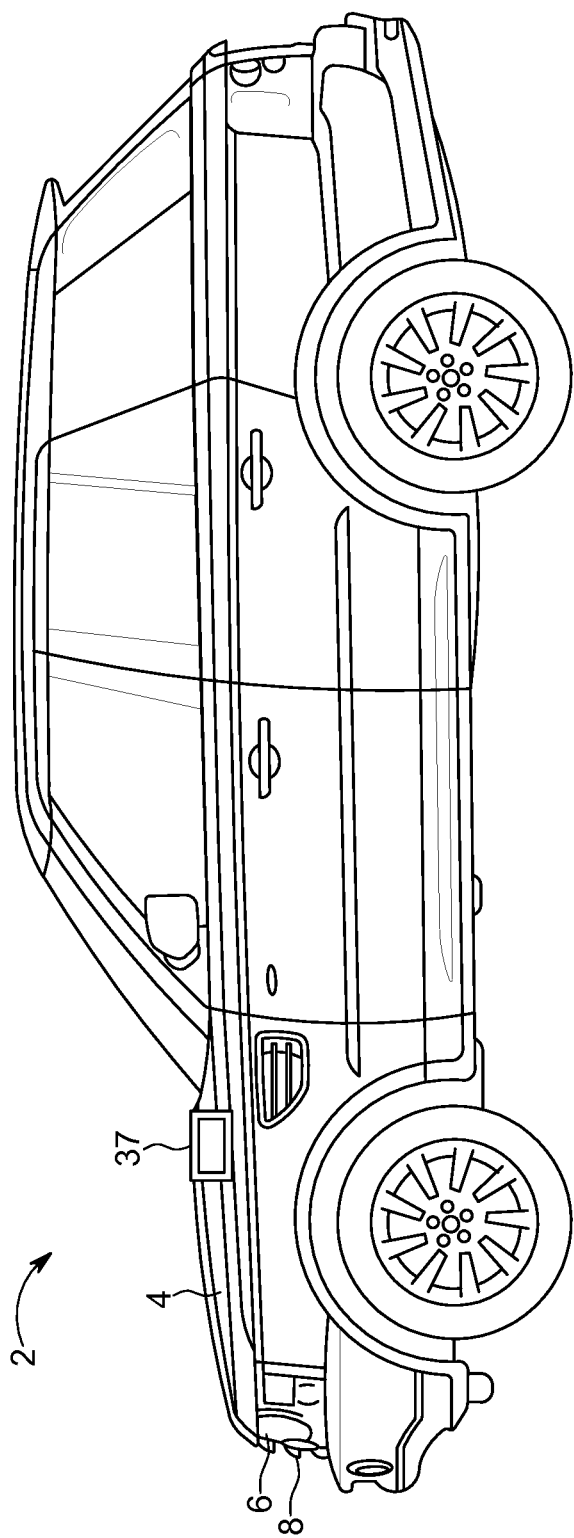
FIG. 1 is a side elevation of a motor vehicle.

A motor vehicle 2 is provided with a bonnet (or hood) 4, headlamps 6 and a grill 8, all arranged at a front end of the motor vehicle 2.

The bonnet 4 is movably coupled to the motor vehicle 2 and arranged to provide a closure member for an engine compartment 10. The bonnet 4 is movable between open condition, in which the bonnet 4 is hinged away from the headlamps 6 and grill 8, and a closed condition, in which the bonnet 4 is hinged adjacent to the headlamps 6 and grill 8. In the open condition, the bonnet 4 allows access to the engine compartment 10. In the closed condition, the bonnet 4 is secured by means of a bonnet catch 5. The bonnet 4 comprises an external panel 14 and an internal panel 20. The external panel 14 has an upper surface 16 and a lower surface 18. Similarly, the internal panel 20 has an upper surface 22 and a lower surface 24.

Figure 4:
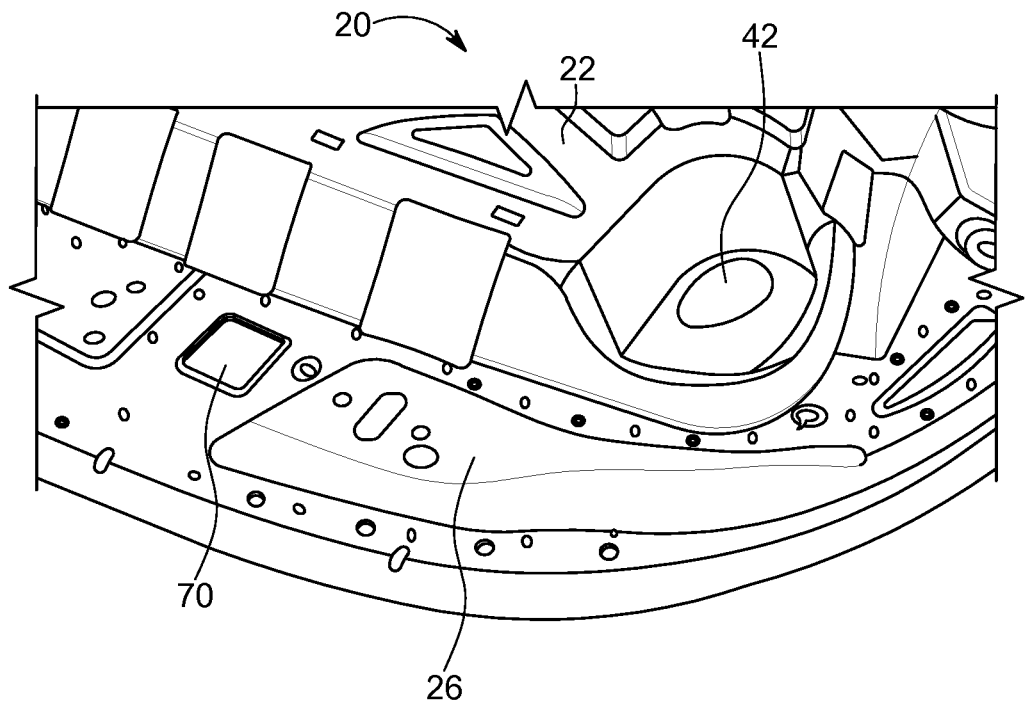
FIG. 4 is an isometric view of the bonnet internal panel.

The external panel 14 provides the aerodynamic form of the motor vehicle 2. A wade duct orifice 37 is defined in the external panel 14. The internal panel 20 (see FIG. 4) includes various orifices so as to provide flow paths as will be described in more detail below. The internal panel 20 is sculpted so as to define a scallop 26 between the forward and rearward seals.

Figure 2:
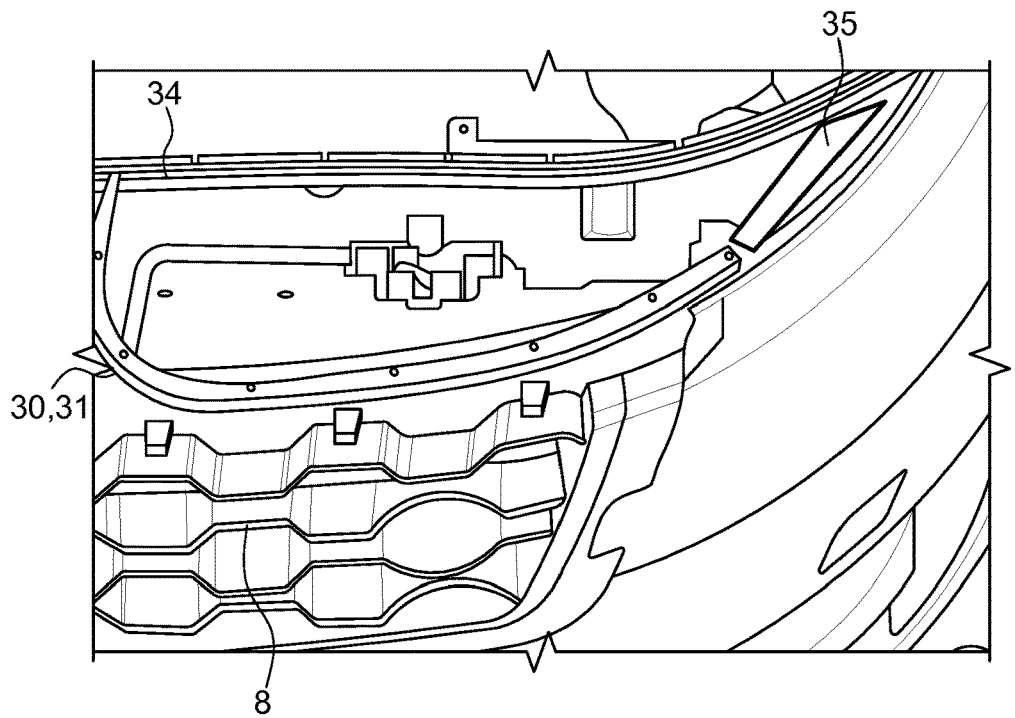
FIG. 2 is an isometric view of the front right hand side of the motor vehicle of FIG. 1.
Figure 3:
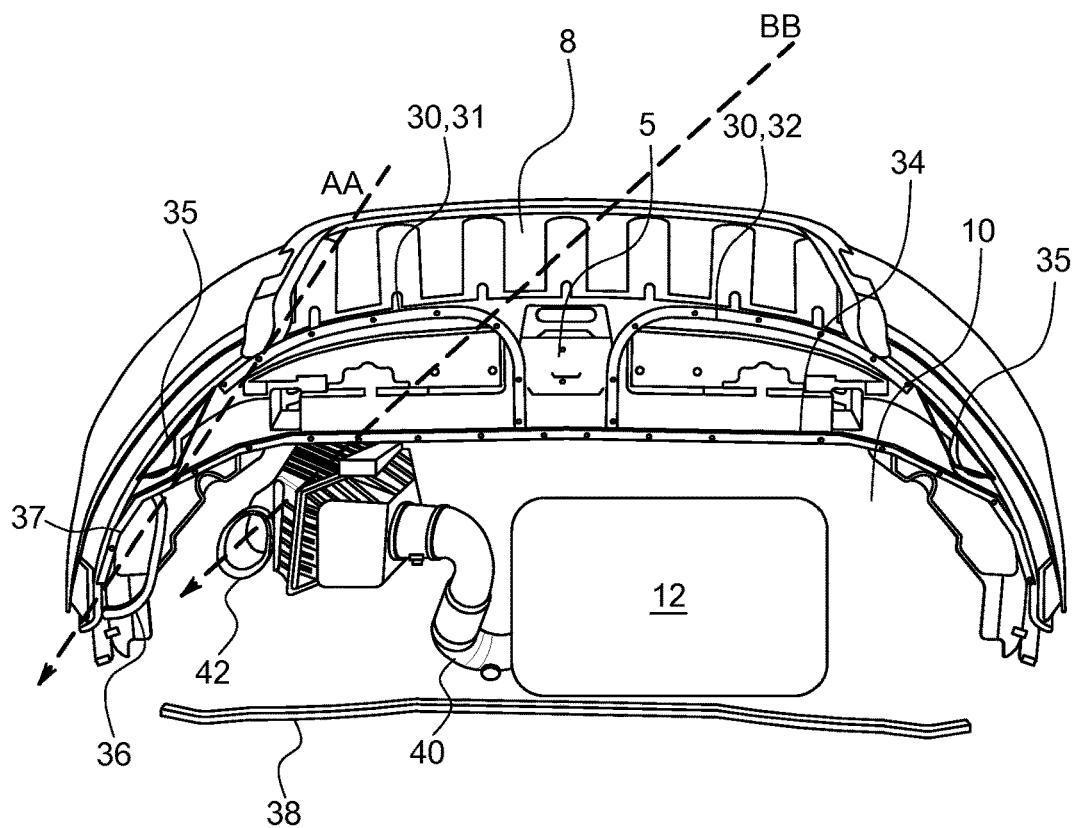
FIG. 3 is a plan view of the front of the motor vehicle of FIG. 1.

Referring to FIGS. 2 and 3, the motor vehicle 2 is provided with a bonnet seal arrangement. The bonnet seal arrangement comprises a forward seal 30 and a rearward seal 34.

The forward seal 30 and the rearward seal 34 are fixed to the internal panel 20 lower surface 24. The forward seal 30 comprises a port forward seal member 31 and a starboard forward seal member 32. The port forward seal member 31 and a starboard forward seal member 32 are substantially identical, and arranged about a vehicle centreline in mirror image. The port forward seal member 31 is arranged on the port side of the motor vehicle 2, and the starboard forward seal member 32 is arranged on the starboard side of the motor vehicle 2.

In the bonnet closed condition, the port forward seal member 31 seals against the engine compartment 10, extending forward from the bonnet catch 5, to an upper surface of the grill 8 and laterally over an upper surface of the port headlamp 6.

Similarly, in the bonnet closed condition, the starboard forward seal member 32 seals against the engine compartment 10, extending forward from the bonnet catch 5, to an upper surface of the grill 8 and laterally over an upper surface of the starboard headlamp 6.

In the bonnet closed condition, the rearward seal 34 seals against the engine compartment 10 and extends laterally for the full width thereof. The rearward seal 34 is positioned approximately one third of the way rearwards into the engine compartment 10 from the grill 8.

The rearward displacement of the rearward seal 34 from the port and starboard forward seal members 31, 32 defines a transition gap 35 between the forward and rearward seals 30, 34.

The bonnet seal arrangement further comprises a wade duct seal 36 and an end seal 38. The wade duct seal 36 and the end seal 38 are fixed to the internal panel 20 lower surface 24.

The wade duct seal 36 extends rearwards from close to an outboard edge of the rearward seal 34, around the wade duct orifice 37, to the port side of the motor vehicle 2.

In the bonnet closed condition, the end seal 38 seals against the engine compartment 10 and extends laterally for the full width thereof. The end seal 38 is positioned at the rearward edge of the engine compartment 10.

Engine Air Intake

Figure 5:
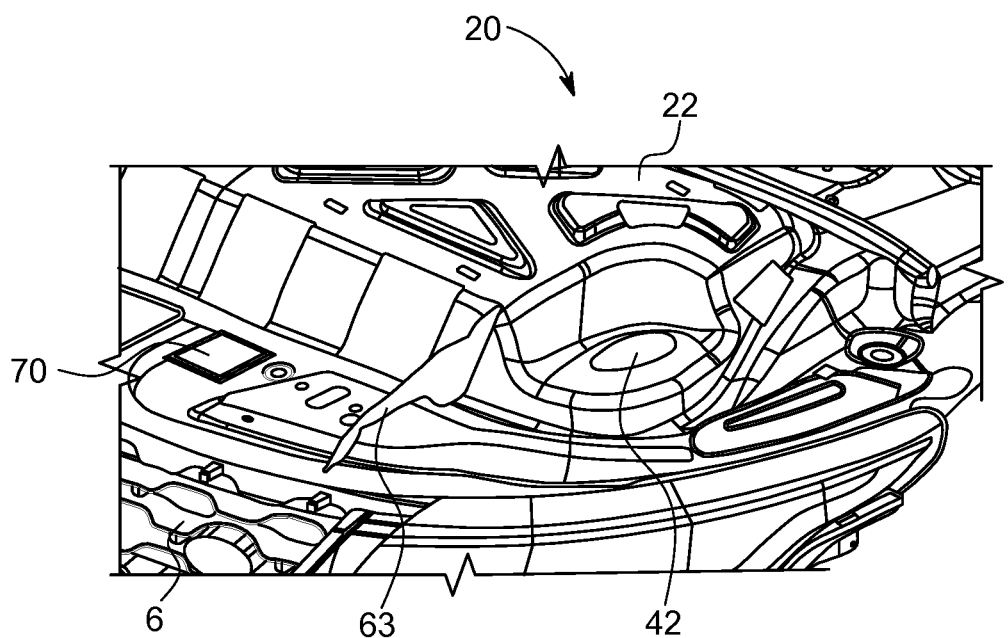
FIG. 5 is an isometric view of the bonnet internal panel installed on the motor vehicle of FIG. 1.

Within the engine compartment 10 there is provided an engine 12. The engine is fed with air via an engine air intake duct 40. The engine air intake duct 40 is fluidly connected to a cavity between the internal panel 20 upper surface 22 and the external panel 14 lower surface 18 via orifice 42 (see FIGS. 4 and 5). Orifice 42 is formed in the internal panel 20. The cavity is further fluidly connected to a pair of primary air intake orifices 70, 71 also formed in the internal panel 20. The primary air intake orifices 70, 71 are arranged on the port and starboard sides of the motor vehicle, in between the forward and rearward seals 30, 34.

The engine air intake duct 40 is thus in fluid communication with the lower surface 24 of the bonnet internal panel 20, via the cavity defined between the external and internal bonnet panels 14, 20.

In use, the engine provides a source of low or negative pressure, to draw air through the air intake orifices 70, 71, through the cavity, through the orifice 41, along the air intake duct 40 and into the engine 12.

Contaminated Air Flow

Figure 6:
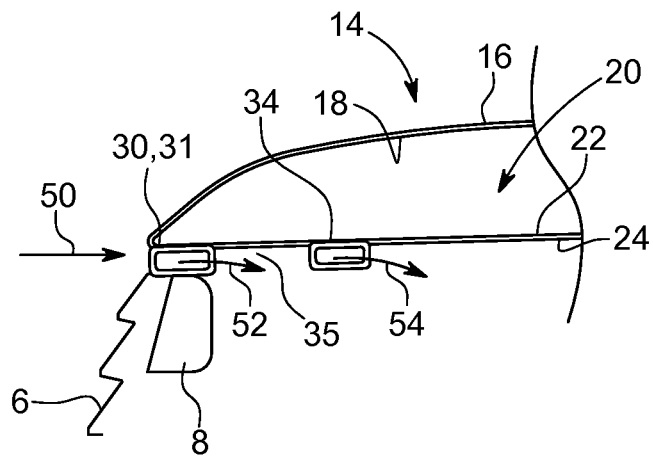
FIG. 6 is a schematic cross-section taken at line A-A of FIG. 1.
Figure 7:
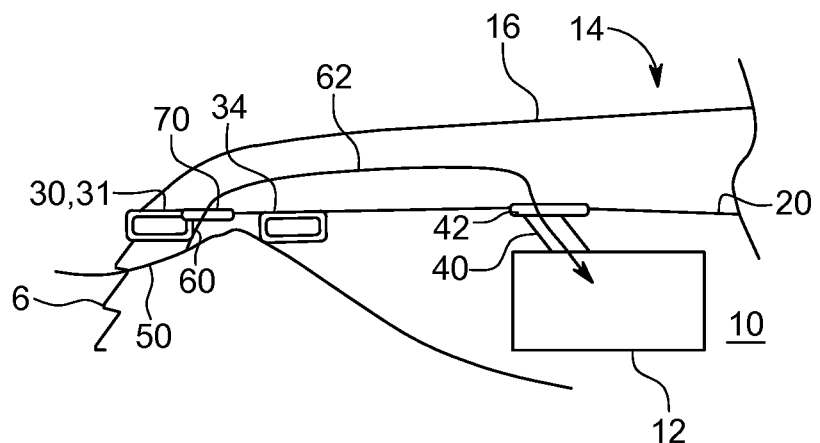
FIG. 7 is a schematic cross-section taken at line B-B of FIG. 1.

Air flow paths through the motor vehicle will now be described with reference to FIGS. 6 and 7. The air flow paths are generated when the vehicle is in use, and moving in a predominantly forward direction.

Firstly, ram air 50 enters the front of the motor vehicle 2 through and over the grill 8. The ram air may be laden with contaminants such as water, snow, sand, dust and as such is generally termed as a contaminated air flow.

The forward seal 30 is configured to deflect the ram air 50 towards the rearward seal 34, across the transition gap 35. This is shown by the upstream contaminated air flow arrow 52. Ram air 50 hitting the forward seal 30 is forced to flow around the forward seal 30, and is prevented from entering the engine compartment 10.

The rearward seal 34 receives the upstream contaminated air flow (represented by arrow 52) from the forward seal 30. The upstream contaminated air flow (arrow 52) hitting the rearward seal 34 is forced to flow around the rearward seal 34, and is prevented from entering the engine compartment 10. The rearward seal 34 is configured to deflect the ram air 50 (upstream contaminated air flow arrow 52) away from the motor vehicle 2 shown by the downstream contaminated air flow arrow 54. The downstream contaminated air exits the motor vehicle 2 through a gap between the internal panel 20 lower surface 24 and a fender region of the motor vehicle 2.

Uncontaminated Air Flow

As described above, the source of low or negative pressure provided by the engine, draws air through the air intake orifices 70. This source of low or negative pressure provides a sufficient draw so as to draw uncontaminated air from the ram air 50 entering the front of the motor vehicle 2 through and over the grill 8. This is shown in FIG. 7 as upstream uncontaminated air flow arrow 60 passing between the forward seal 30 and the rearward seal 34, across the transition gap 35. The scallop 26 provides a region of flow expansion to decelerate the upstream uncontaminated air drawn from the contaminated air passing the transition gap 35. The uncontaminated air flow passes up through the port and starboard primary air intake orifices 70 and is directed through the closed volume between the external and internal bonnet panels 14, 20. This is shown in FIG. 7 as a downstream uncontaminated air flow arrow 62, and in FIG. 5 as a downstream uncontaminated air flow exemplary cross section 63.

The downstream uncontaminated air flow continues to the orifice 42 of the engine air intake duct 40 and thereby is supplied to the engine 12.

The shape of the end of the port and starboard seals 31, 32, over the port and starboard headlamps 6, respectively, may be arranged such that the upstream position of the uncontaminated air flow path 60, between the forward and rearward seals 30, 34 extends substantially orthogonally to the vehicle body longitudinal axis.

Furthermore, the shape of the end of the port and starboard seals, 31, 32 over the port and starboard headlamp 6, respectively, may be arranged such that the upstream portion of the uncontaminated air flow path 60 between the forward and rearward seals 30, 34, extends substantially orthogonally to the ram air flowing around the forward seal 30, towards the rearward seal 34, across the transition gap 35.

Wading Duct

A further uncontaminated air flow path is defined between the wade air duct orifice 37 and engine air intake duct orifice 42.

Figure 8:
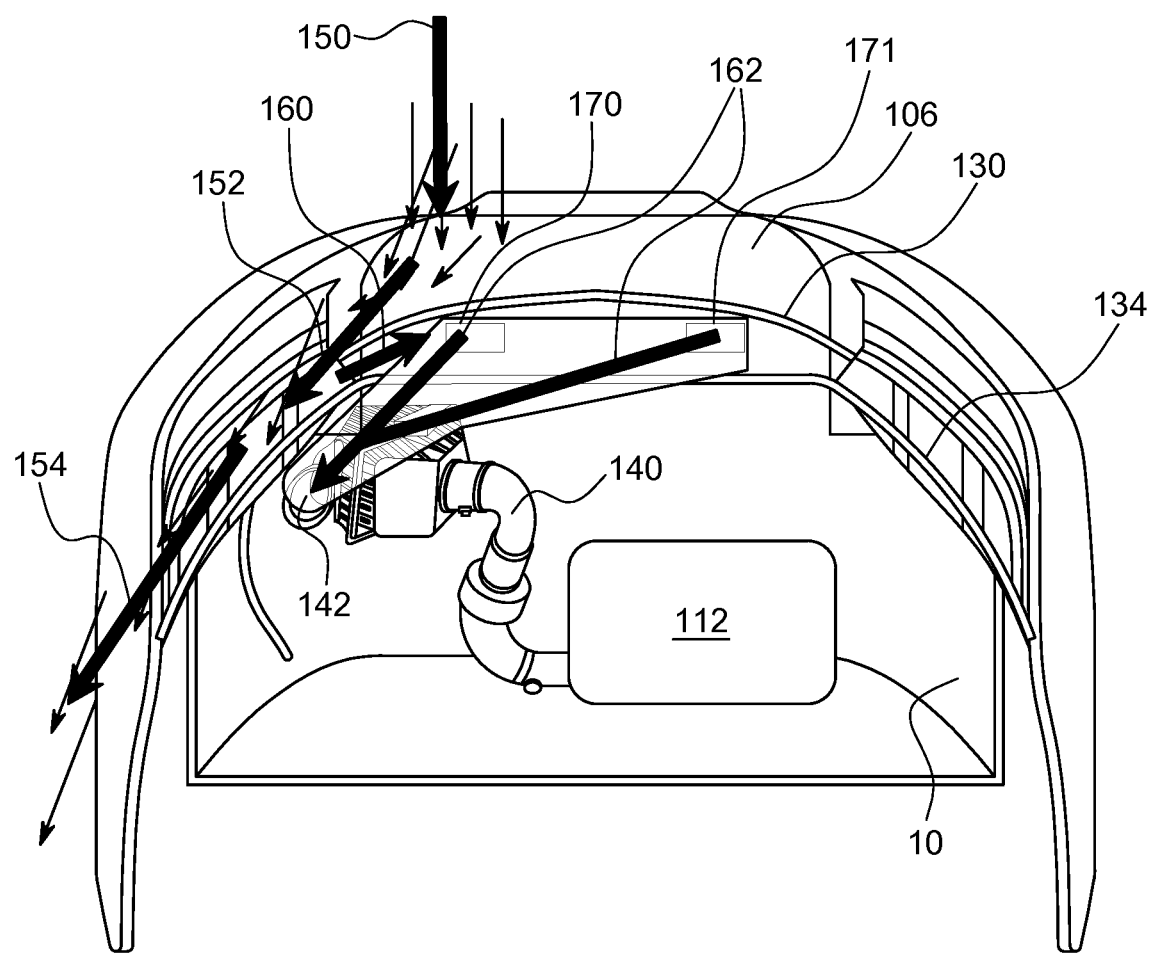
FIG. 8 is a plan view of the front of the motor vehicle of FIG. 1 in accordance with a further embodiment.

A further embodiment is shown in FIG. 8. Similar reference numerals have been used to identify features in common with embodiment described with respect to FIGS. 1 to 7, the reference numbers being prefixed with a "1" to denote they relate to the further embodiment.

The bonnet seal arrangement of FIG. 8 is substantially similar to the bonnet seal arrangement of FIG. 3, such that only substantially differences shall be described.

The bonnet seal arrangement comprises an external panel 114, an internal panel 120, a forward seal 130 and a rearward seal 134 (the external panel 114 and the internal panel 120 are not shown in FIGS. 2 and 3 for clarity). The forward seal 130 comprises a single member, such that the pair of primary air intake orifices 170 are in fluid communication with each other.

The invention claimed is:

1. A motor vehicle comprising:
   a vehicle body;
   an engine compartment housing an engine;
   a bonnet movably coupled to the body and arranged to provide a closure member for the engine compartment, the bonnet being movable between open and closed conditions;
   a bonnet seal arrangement defining an opening that allows airflow into the opening in an intake direction; and
   an engine air intake duct having an orifice configured to draw air into the engine;
   wherein the bonnet seal arrangement is configured to deflect ram air received at a front of the motor vehicle in a deflection direction that is different than the intake direction to define a first air flow path adjacent to and across the opening, and
   wherein the engine is configured to provide negative pressure to draw some of the air from the first air flow path and flowing across the opening through the opening along a second air flow path for supplying air to the intake duct orifice, the second air flow path being at least partially aligned with the intake direction.

2. The motor vehicle according to claim 1, wherein the bonnet seal arrangement comprises a first seal and a second seal located aft of the first seal along the first air flow path.

3. The motor vehicle according to claim 2, wherein the first seal comprises two seal members.

4. The motor vehicle according to claim 1, wherein the bonnet seal arrangement is arranged on a lower surface of the bonnet.

5. The motor vehicle according to claim 1, wherein a portion of the second air flow path that upstream of the opening extends orthogonally to a longitudinal axis of the vehicle body.

6. The motor vehicle according to claim 1, wherein portion of the second air flow path extends substantially orthogonally to the first air flow path.

7. The motor vehicle according to claim 1, wherein the bonnet comprises a cavity.

8. The motor vehicle according to claim 7, wherein the cavity of the bonnet is defined by an external panel and an internal panel.

9. The motor vehicle according to claim 8, wherein the internal panel is sculpted to define an upstream portion of the second air flow path.

10. The motor vehicle according to claim 8, wherein an upstream portion of the second air flow path is fluidly connected to a primary air intake orifice formed in the internal panel.

11. The motor vehicle according to claim 7, wherein a downstream portion of the second air flow path is defined within the cavity of the bonnet.

12. The motor vehicle according to claim 1, wherein a downstream portion of the second air flow path terminates at the engine air intake duct orifice.

13. The motor vehicle according to claim 1, wherein a third air flow path is defined between a wade duct orifice in the bonnet, for providing intake air to the engine if a portion of the front of the vehicle becomes submerged in liquid in use, and the engine air intake duct orifice.

14. The motor vehicle according to claim 13, wherein a wade duct seal extends from the bonnet seal arrangement around the wade duct orifice.

15. The motor vehicle according to claim 1, wherein the intake direction is at an oblique angle relative to the deflection direction.

16. The motor vehicle according to claim 1, wherein the intake direction is orthogonal to the deflection direction.

17. The motor vehicle according to claim 1, wherein the first airflow path is orthogonal to the opening.

18. The motor vehicle according to claim 1, wherein the first airflow path is at least partially directed from a center of the vehicle toward an outside edge of the vehicle and the second airflow path is at least partially directed toward the center of the vehicle.

* * * * *